US012603337B2

(12) United States Patent
Yoshioka

(10) Patent No.: US 12,603,337 B2
(45) Date of Patent: Apr. 14, 2026

(54) METHOD OF NEWLY PRODUCING LITHIUM-ION SECONDARY BATTERY USING AN ELECTRODE PLATE OF A USED LITHIUM-ION SECONDARY BATTERY

(71) Applicant: Prime Planet Energy & Solutions, Inc., Tokyo (JP)

(72) Inventor: Masahiro Yoshioka, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 696 days.

(21) Appl. No.: 17/932,292

(22) Filed: Sep. 15, 2022

(65) Prior Publication Data

US 2023/0125431 A1     Apr. 27, 2023

(30) Foreign Application Priority Data

Oct. 26, 2021     (JP) ................................. 2021-174680

(51) Int. Cl.
H01M 10/54        (2006.01)
H01M 10/0525      (2010.01)
H01M 50/609       (2021.01)

(52) U.S. Cl.
CPC ....... H01M 10/54 (2013.01); H01M 10/0525 (2013.01); H01M 50/609 (2021.01)

(58) Field of Classification Search
CPC . H01M 10/0525; H01M 10/54; H01M 50/609
See application file for complete search history.

(56) References Cited

U.S. PATENT DOCUMENTS

2017/0125840 A1     5/2017   Akiyama et al.
2023/0125431 A1*    4/2023   Yoshioka ............ H01M 50/609
                                                              29/623.1

FOREIGN PATENT DOCUMENTS

| CN | 101212061 | A | 7/2008 | |
| CN | 106654168 | A | 5/2017 | |
| CN | 109286042 | A | 1/2019 | |
| EP | 3319153 | A1 * | 5/2018 | ............ H01G 11/46 |
| JP | H04-282563 | A | 10/1992 | |
| JP | 200679953 | A | 3/2006 | |
| JP | 201222969 | A | 2/2012 | |
| JP | 2014127417 | A | 7/2014 | |

* cited by examiner

*Primary Examiner* — Minh N Trinh
(74) *Attorney, Agent, or Firm* — HAUPTMAN HAM, LLP

(57)         ABSTRACT

A method of newly producing a lithium-ion secondary battery using an electrode plate of a used lithium-ion secondary battery includes providing the electrode plate of the used lithium-ion secondary battery; cleansing the electrode plate by polar solvent; and drying the electrode plate thereafter to obtain a cleansed electrode plate. The method includes forming an electrode body and attaching the cleansed electrode plate to the electrode body; and securing the electrode body inside a battery case. The method includes injecting non-aqueous electrolytic solution between the battery case and the cleansed electrode plate. The non-aqueous electrolytic solution includes lithium salt containing element fluorine and a pH level of which is in a range of 6 to 8. The method includes contacting the non-aqueous electrolytic solution with a basic lithium compound to form a pH-level-adjusted non-aqueous electrolytic solution. The method includes injecting the pH-level-adjusted non-aqueous electrolytic solution in the battery case.

1 Claim, 7 Drawing Sheets

160,260

166        162(163)

B        B 165        161

160,260

161        162(163)

165

166

162(163)

METHOD OF NEWLY PRODUCING LITHIUM-ION SECONDARY BATTERY USING AN ELECTRODE PLATE OF A USED LITHIUM-ION SECONDARY BATTERY

CROSS-REFERENCE TO RELATED APPLICATIONS

This application is based upon and claims the benefit of priority from the prior Japanese Patent Application No. 2021-174680 filed on Oct. 26, 2021, the entire contents of which are incorporated herein by reference.

BACKGROUND

Technical Field

The present disclosure relates to an adjusting method of a non-aqueous electrolytic solution and a producing method of a lithium-ion secondary battery with a reused electrode plate.

Related Art

JP2012-022969A discloses a recycling method of an electrode plate of a used lithium-ion secondary battery and a method of newly producing a lithium-ion secondary battery using the recycled electrode plate. Specifically, the used lithium-ion secondary battery is disassembled and the electrode plate is taken out of the used lithium-ion secondary battery. The thus taken-out electrode plate (a positive electrode plate and a negative electrode plate) are cleansed with polar solvent and then dried to obtain a cleansed electrode plate. Thereafter, this cleansed electrode plate is used for producing an electrode body, and the thus produced electrode body is housed in a battery case. After that, non-aqueous electrolytic solution including lithium (Li) salt (for example, $LiPF_6$) containing element fluorine is injected in the battery case.

SUMMARY

Technical Problems

However, the non-aqueous electrolytic solution including the Li salt containing element fluorine may generate hydrofluoric acid (HF) by the contact of moisture with the Li salt. The thus HF-included non-aqueous electrolytic solution could decrease its pH level in a range of 4 to 5, for example. Accordingly, as mentioned above, when an electrode plate of a used lithium-ion secondary battery is reused to newly produce a lithium-ion secondary battery with the reused electrode plate, use of this non-aqueous electrolytic solution including the HF with low pH level results in formation of a lithium fluoride (LiF) coating with high resistance on an electrode active material surface by the reaction of the HF in the non-aqueous electrolytic solution with lithium included in the coating of the electrode active material surface of the reused electrode plate, so that an IV resistance of the lithium-ion secondary battery with the reused electrode plate could be large. To address this, there has been a demand for reducing an HF amount in the non-aqueous electrolytic solution.

Herein, even if an electrode plate (a positive electrode plate and a negative electrode plate), which is taken out of a used lithium-ion secondary battery, is cleansed by polar solvent, a coating (coating including lithium) having existed on the electrode active material surface before cleansing is hardly removed. Accordingly, a coating containing the lithium exists on the electrode active material surface of the cleansed electrode plate (the cleansed positive electrode plate and the cleansed negative electrode plate).

The present disclosure has been made in view of the above circumstances and has a purpose of providing an adjusting method of non-aqueous electrolytic solution that achieves reduction of HF included in the non-aqueous electrolytic solution and a producing method of a lithium-ion secondary battery with a reused electrode plate that achieves production of the lithium-ion secondary battery having a small IV resistance with the reused electrode plates.

Means of Solving the Problems

One aspect of the present disclosure is a method of adjusting non-aqueous electrolytic solution wherein the non-aqueous electrolytic solution includes lithium salt containing element fluorine, the non-aqueous electrolytic solution is configured to be brought into contact with a basic lithium compound to become a pH-level-adjusted non-aqueous electrolytic solution in which a pH level is adjusted in a range of 6 to 8 inclusive.

In the above-mentioned method of adjusting the non-aqueous electrolytic solution, the non-aqueous electrolytic solution is brought into contact with the basic Li compound (such as $Li_3PO_4$) to adjust the pH level of the non-aqueous electrolytic solution to be within a range of 6 to 8 inclusive so that the pH-level-adjusted non-aqueous electrolytic solution is formed. This method achieves reduction or removal of the HF contained in the non-aqueous electrolytic solution.

Herein, a specific example of the method of adjusting the non-aqueous electrolytic solution is, for example, to mix the non-aqueous electrolytic solution with the basic Li compound for reaction of the basic Li compound with the HF, and then to remove precipitates (non-dissolved substance) from the electrolytic solution. One method of removing the precipitates is to extract a supernatant liquid or a filtrate of the electrolytic solution. When $Li_3PO_4$ is used as the basic Li compound, a chemical equation of the basic Li compound with the HF is assumed to be represented as $Li_3PO_4 + 3HF \rightarrow 3LiF + H_3PO_4$ ($H^+ + H_2PO_4^-$).

Further, when the thus adjusted non-aqueous electrolytic solution is used as the non-aqueous electrolytic solution of a lithium-ion secondary battery with a reused electrode plate, reaction of lithium included in a coating of an electrode active material surface with the HF reduces creation of a LiF coating with high resistance on the electrode active material surface. Accordingly, the adjusted non-aqueous electrolytic solution, a pH level of which has been adjusted by the above-mentioned method of adjusting the non-aqueous electrolytic solution, can reduce the IV resistance of the lithium-ion secondary battery with the reused electrode plate.

As the basic Li compound, preferably, $Li_3PO_4$ (lithium phosphate), $Li_2CO_3$ (lithium carbonate), $Li_3C_6H_5O_7$ (lithium citrate), and others which make a reaction with the HF without generating moisture and in which the basic Li compound itself and a reaction product of the basic Li compound and the HF do not dissolve in a solvent of the non-aqueous electrolytic solution but just precipitate.

Further, a basic-Li-compound-added non-aqueous electrolytic solution which is a non-aqueous electrolytic solution including Li salt containing element fluorine, in which the basic Li compound is added, is preferable.

This basic-Li-compound-added non-aqueous electrolytic solution includes the Li salt containing the element fluorine and is added with the basic Li compound. Accordingly, even if moisture is mixed in the non-aqueous electrolytic solution to generate the HF, the basic Li compound added to the non-aqueous electrolytic solution and the HF make a reaction to reduce or remove the HF. Hereinafter, an addition amount of the basic Li compound is preferable to be adjusted such that the pH level of the non-aqueous electrolytic solution is maintained within the range of 6 to 8 inclusive.

Another aspect of the present disclosure is a method of newly producing a lithium-ion secondary battery with a reused electrode plate by reusing an electrode plate of a used lithium-ion secondary battery, the method including: cleansing and drying by cleansing the electrode plate having been taken out of the used lithium-ion secondary battery by polar solvent and by drying the electrode plate thereafter to obtain a cleansed electrode plate, producing an electrode body with the cleansed electrode plate, housing the electrode body in a battery case, and injecting non-aqueous electrolytic solution, which includes lithium salt containing element fluorine and a pH level of which is in a range of 6 to 8 inclusive, in the battery case.

According to the above-mentioned method of producing a lithium-ion secondary battery with the reused electrode plate (hereinafter, referred as an electrode-plate-reused lithium-ion secondary battery), in the injecting, the non-aqueous electrolytic solution including the Li salt containing element fluorine and having the pH level within the range of 6 to 8 inclusive is injected in the battery case which accommodates the electrode body. The non-aqueous electrolytic solution including the Li salt containing element fluorine and having the pH level within the range of 6 to 8 inclusive is non-aqueous electrolytic solution that has been reduced or removed the HF. Thereby, the reaction between the lithium included in the coating of the electrode active material surface and the HF included in the non-aqueous electrolytic solution is restrained, so that it is possible to reduce formation of the LiF coating with high resistance on the electrode active material surface due to the subject reaction. Accordingly, it is achieved to produce the electrode-plate-reused lithium-ion secondary battery having less IV resistance.

Herein, even if an electrode plate (a positive electrode plate or a negative electrode plate) taken out of the used lithium-ion secondary battery is cleansed with polar solvent (for example, ethyl methyl carbonate), the coating (the coating including lithium) having existed on the electrode active material surface before cleansing is hard to be removed. Therefore, the coating including lithium exists on the electrode active material surface of the cleansed electrode plate (a cleansed positive electrode plate and a cleansed negative electrode plate). Accordingly, the electrolytic solution injected in the injecting comes to contact with the lithium included in the coating of the electrode active material surface of the cleansed electrode plate. As the polar solvent, it is preferable to use a polar organic solvent which is used as a solvent of the non-aqueous electrolytic solution for a lithium-ion secondary battery, and examples of the polar organic solvent are given as EMC (ethyl methyl carbonate), DMC (dimethyl carbonate), DEC (diethyl carbonate), and EC (ethylene carbonate). Herein, the used lithium-ion secondary battery is a lithium-ion secondary battery which was collected after being used as a power source for vehicles and electric appliances.

Further preferably, the above-mentioned method of producing the lithium-ion secondary battery with the reused electrode plate wherein the method includes non-aqueous electrolytic solution adjusting of bringing the non-aqueous electrolytic solution including lithium salt containing element fluorine into contact with a basic lithium compound to adjust a pH level in a range of 6 to 8 inclusive to form a pH-level-adjusted non-aqueous electrolytic solution, and the injecting is to inject the pH-level-adjusted non-aqueous electrolytic solution in the battery case.

In the above producing method, in the non-aqueous electrolytic solution adjusting, the non-aqueous electrolytic solution including Li salt containing element fluorine is brought into contact with the basic Li compound to form the pH-level-adjusted non-aqueous electrolytic solution which has been adjusted its pH level to be within the range of 6 to 8 inclusive. Then, this pH-level-adjusted non-aqueous electrolytic solution is injected in the battery case in the injecting. Namely, the pH-level-adjusted non-aqueous electrolytic solution that has been reduced or removed in an amount of the HF by the contact of the basic Li compound is used as an electrolytic solution for the lithium-ion secondary battery with the reused electrode plate. Thus, the reaction between the lithium included in the coating on the electrode active material surface and the HF included in the non-aqueous electrolytic solution is reduced, so that it is possible to reduce formation of the LiF coating with high resistance on the electrode active material surface due to the subject reaction. Accordingly, the electrode-plate-reused lithium-ion secondary battery having small IV resistance can be produced.

DETAILED DESCRIPTION OF THE EXEMPLARY EMBODIMENTS

Figure 1:
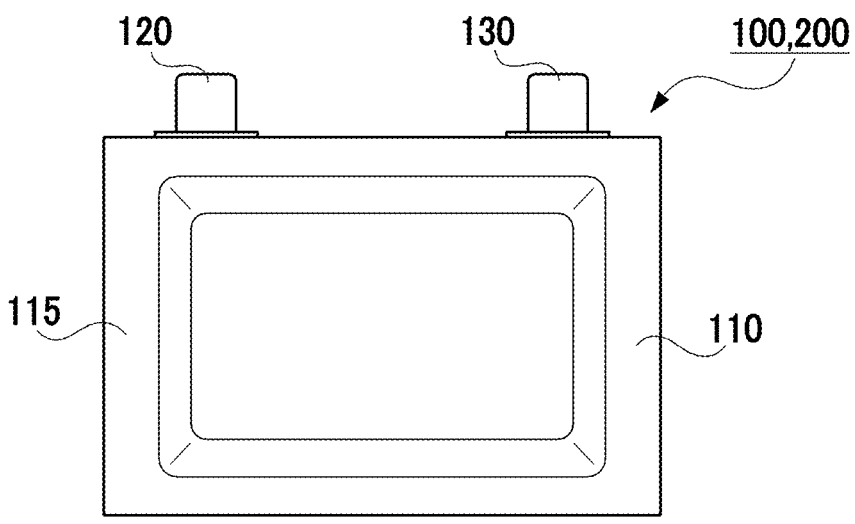
FIG. 1 is a plan view of a lithium-ion secondary battery with a reused electrode plate in an embodiment.
Figure 2:
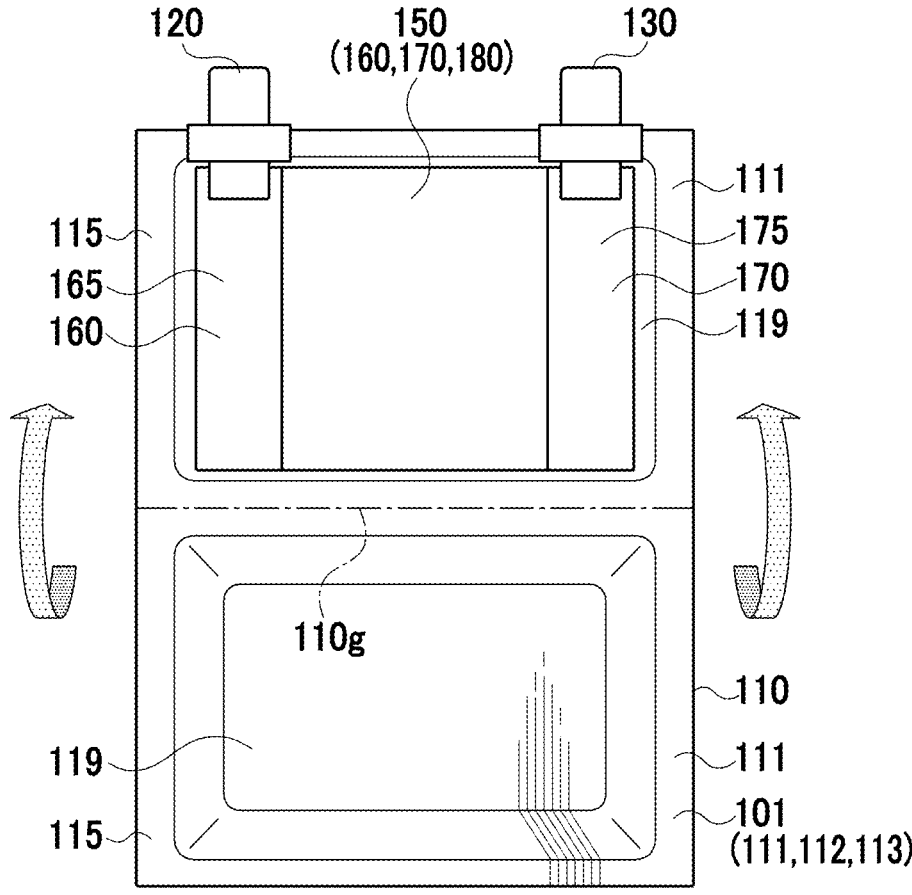
FIG. 2 is an explanatory view of a method of producing the lithium-ion secondary battery with the reused electrode plate.

An embodiment of the present disclosure is now explained. FIG. 1 is a plan view of a lithium-ion secondary battery 100 with a reused electrode plate (hereinafter, also referred as an electrode-plate-reused secondary battery 100) according to the embodiment. FIG. 2 is an explanatory view illustrating a method of producing the electrode-plate-reused secondary battery 100, illustrated with an electrode body 150 disposed in a housing portion 119 of a battery case 110. The electrode-plate-reused secondary battery 100 is, as shown in FIG. 1, provided with a battery case 110 of a rectangular shape in plan view, a positive electrode terminal 120 extending outside from an inside of the battery case 110, and a negative electrode terminal 130 extending outside from the inside of the battery case 110.

Further, as shown in FIG. 2, the electrode body 150 is housed inside the battery case 110 as shown in FIG. 2. This electrode body 150 is a laminated-type electrode body in which a positive electrode plate 160, a negative electrode plate 170, and a separator 180 interposed therebetween are laminated. Among these, the positive electrode plate 160 is of a rectangular shape in plan view and formed with a positive current collecting foil 166 formed of an aluminum foil and a positive electrode mixture layer 162 laminated on a surface (both faces) of the positive current collecting foil 166 (see FIG. 3 and FIG. 4). The positive electrode mixture layer 162 is provided with a positive active material 163, a binder (not shown), and a conductive assistant (not shown). Herein, in the present embodiment, a lithium-transition metal composite oxide (specifically, $LiNi_{1/3}Co_{1/3}Mn_{1/3}O_2$) is used as the positive active material 163. A non-laminated portion 165, which is not laminated with the positive electrode mixture layer 162 on the surface (both faces) of the positive current collecting foil 166 in the positive electrode plate 160, is welded with the positive electrode terminal 120.

Figure 5:
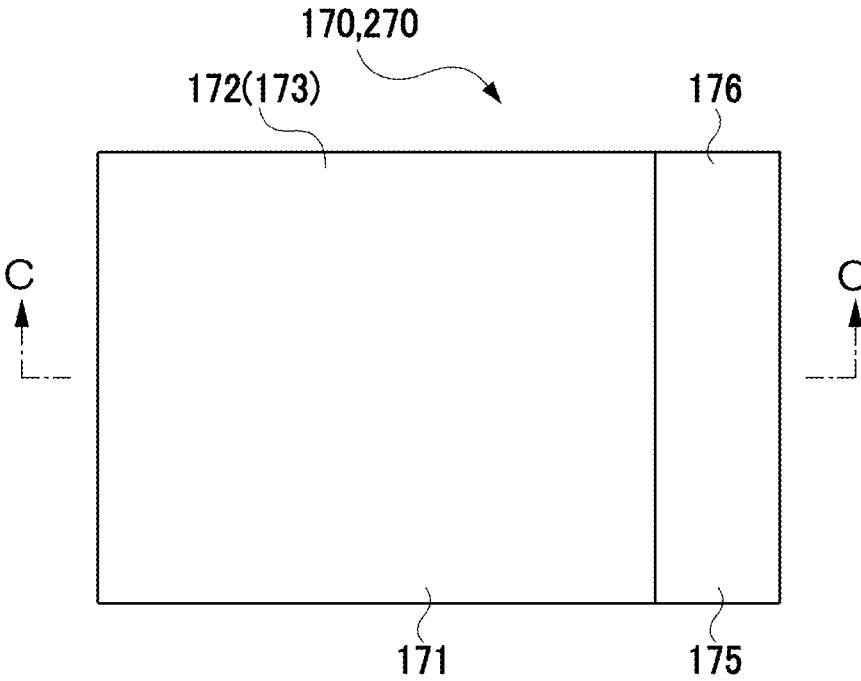
FIG. 5 is a plan view of a negative electrode plate in the embodiment.
Figure 6:
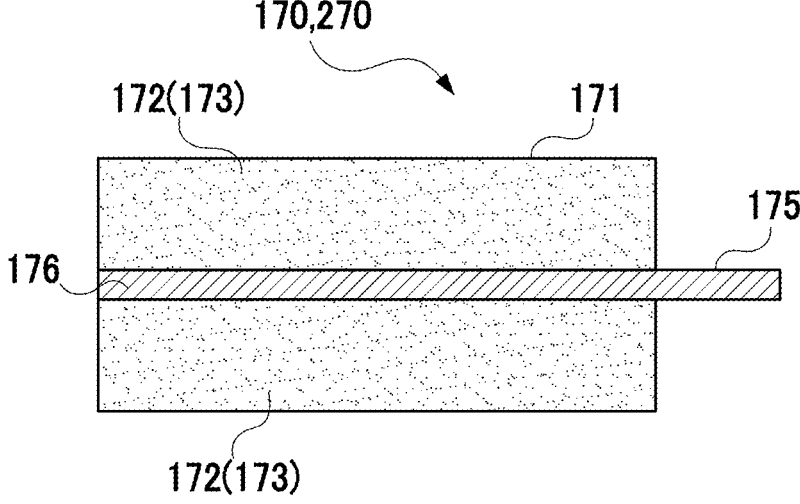
FIG. 6 is a sectional view taken along a line C-C in FIG. 5.

The negative electrode plate 170 is of a rectangular shape in plan view and is provided with a negative current collecting foil 176 formed of a copper foil and a negative electrode mixture layer 172 laminated on a surface (both faces) of the negative current collecting foil 176 (see FIG. 5 and FIG. 6). Herein, in the present embodiment, graphite is used as the negative active material 173. A non-laminated portion 175, which is not laminated with the negative electrode mixture layer 172 on the surface (both faces) of the negative current collecting foil 176, is welded with the negative electrode terminal 130.

The battery case 110 is formed of a laminate film 101 in which an inner resin film 111 placed on the most inner side of the battery case 110, a metal film 112 placed externally adjacent to this inner resin film 111, and an outer resin film 113 placed externally adjacent to this metal film 112 are laminated. This battery case 110 is formed in a manner that the laminate film 101 on which the electrode body 150 is placed in the housing portion 119 is folded at a folding part 110g as shown in FIG. 2, and thus a welding sealing portion 115 (a peripheral end portion of the battery case 110) of an almost rectangular peripheral shape is sealed by thermal welding to form a rectangular shape in plan view as shown in FIG. 1. Herein, a pH-level-adjusted non-aqueous electrolytic solution 40 explained below is injected in the battery case 110.

Figure 7:
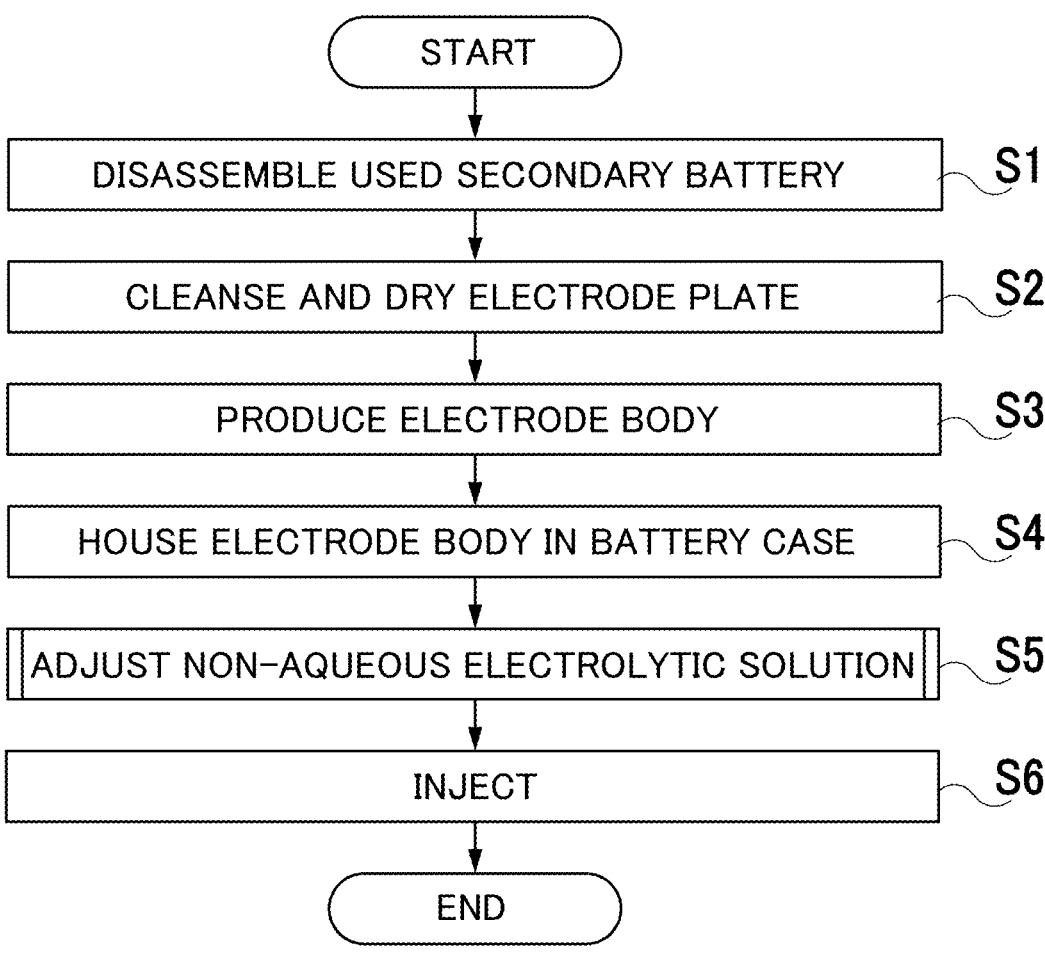
FIG. 7 is a flow chart illustrating a flow of the producing method of the lithium-ion secondary battery with the reused electrode plate in the embodiment.

Next, a method of manufacturing the electrode-plate-reused secondary battery 100 and a method of adjusting the non-aqueous electrolytic solution according to the embodiment is explained. In the present embodiment, electrode plates (a positive electrode plate 260 and a negative electrode plate 270) of the used lithium-ion secondary battery 200 are reused to newly produce the electrode-plate-reused lithium-ion secondary battery 100. FIG. 7 is a flow chart showing a flow of the producing method of the electrodeplate-reused secondary battery 100 according to the present embodiment. Firstly, in step S1, the used lithium-ion secondary battery 200 (hereinafter, referred as a used secondary battery 200) is disassembled to take out the positive electrode plate 260 and the negative electrode plate 270 (see FIG. 3 to FIG. 6).

Figure 3:
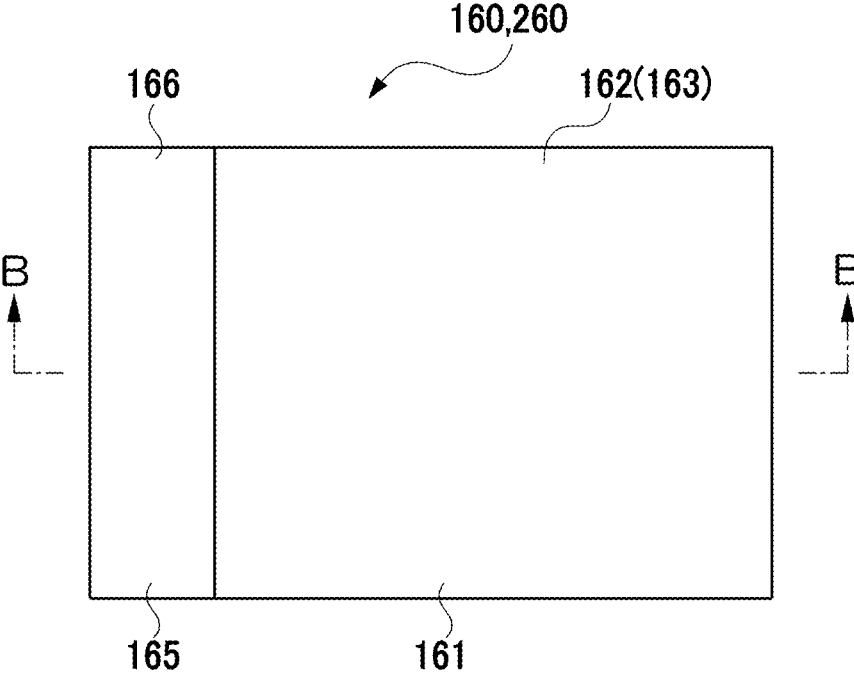
FIG. 3 is a plan view of a positive electrode plate in the embodiment.
Figure 4:
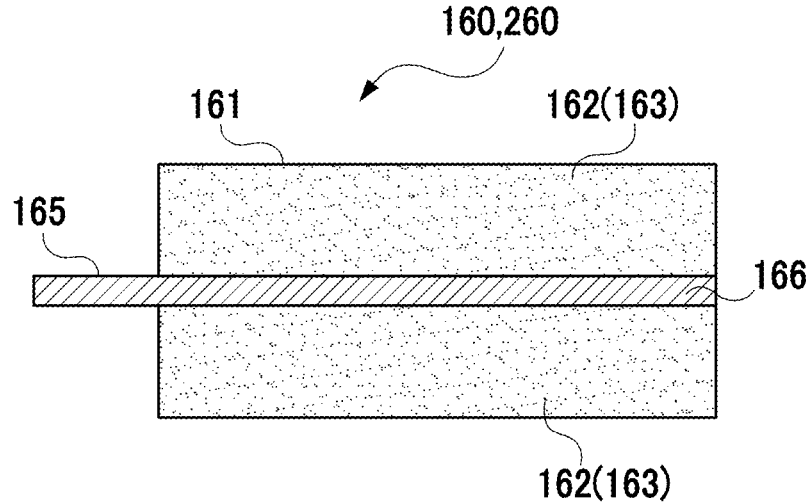
FIG. 4 is a sectional view taken along a line B-B in FIG. 3.

Herein, the used lithium-ion secondary battery 200 is a lithium-ion secondary battery having a similar configuration with the electrode-plate-reused secondary battery 100 as shown in FIG. 1, and a lithium-ion secondary battery (a secondhand lithium-ion secondary battery) which was collected after being used as a power source of a vehicle, an electric appliance, or the like. The positive electrode plate 260 is an electrode plate having the similar configuration with the positive electrode plate 160 as shown in FIG. 3 and FIG. 4, but is a positive electrode plate before cleansing and others are applied to form the positive electrode plate 160. The negative electrode plate 270 is an electrode plate having the similar configuration with the negative electrode plate 170, but is a negative electrode plate before cleansing and others are applied to form the negative electrode plate 170.

Subsequently, in step S2 (a cleansing and drying step), the positive electrode plate 260 and the negative electrode plate 270 which are taken out of the used secondary battery 200 are cleansed with polar solvent and dried thereafter to obtain cleansed electrode plates (the positive electrode plate 160 and the negative electrode plate 170). Specifically, the positive electrode plate 260 is immersed for a predetermined time (10 minutes) in the poler solvent which is housed in a cleansing container in a glove box with an Ar-gas atmosphere. Then, the positive electrode plate 260 is taken out of the polar solvent and immersed for a predetermined time (10 minutes) in unused polar solvent which is housed in a separately prepared another cleansing container in the same glove box with the Ar-gas atmosphere. Thus, the positive electrode plate 260 is cleansed by the polar solvent so that Li salt and others attached to the positive electrode plate 260 is removed from the positive electrode plate 260.

Subsequently, the positive electrode plate 260 is taken out of the polar solvent and then dried in the same glove box with the Ar-gas atmosphere. Thus, the positive electrode plate 160 as the cleansed positive electrode plate is obtained. Further, the negative electrode plate 270 is also cleansed and dried as similar to the above-mentioned positive electrode plate 260 to obtain the negative electrode plate 170 as the cleansed negative electrode plate. Herein, in the present embodiment, polar organic solvent, which is used as the solvent of the non-aqueous electrolytic solution for a lithium-ion secondary battery, is used as the polar solvent. To be specific, as the polar organic solvent, EMC (ethyl methyl carbonate), which is used as a solvent for pH-level-adjusted non-aqueous electrolytic solution 40 explained below is used.

Even if the positive electrode plate 260 and the negative electrode plate 270 which are taken out of the used secondary battery 200 are cleansed with the polar solvent, it is hard to remove coating (coating including lithium) which has existed on surfaces of the positive active material 163 and the negative active material 173 before cleansing. Accordingly, the positive electrode plate 160 and the negative electrode plate 170 as the cleansed electrode plates have existing (remaining) coatings including lithium on the surfaces of the positive active material 163 and the negative active material 173.

Subsequently, in step S3 (an electrode body producing step), the electrode body 150 is produced from the positive electrode plate 160 and the negative electrode plate 170 which are cleansed electrode plates. Specifically, the positive electrode plate 160 and the negative electrode plate 170 are laminated with interposing a separator 180 therebetween to produce the electrode body 150. Herein, the separator 180 is a brand-new separator. Thereafter, the positive electrode terminal 120 is welded to the non-laminated portion 165 of the positive electrode plate 160 configuring the electrode body 150, and the negative electrode terminal 130 is welded to the non-laminated portion 175 of the negative electrode plate 170.

Subsequently, in step S4 (a housing step), the electrode body 150 is housed in the battery case 110. Specifically, the electrode body 150 which have been welded with the positive electrode terminal 120 and the negative electrode terminal 130 is placed in the housing portion 119 of the laminate film 101 (see FIG. 2). Then, the laminate film 101 is folded back at the folding part 110g to accommodate the electrode body 150 therein. Subsequently, of the welding sealing portion 115, a portion except an injection port 116 (see FIG. 11) to be injected with the pH-level-adjusted non-aqueous electrolytic solution 40 is pressurized and heated in its thickness direction to thermally weld inner resin films 111. Thus, the electrode body 150 is housed inside the battery case 110 with extending the positive electrode terminal 120 and the negative electrode terminal 130 from an inside of the battery case 110 (see FIG. 11).

The non-aqueous electrolytic solution including the Li salt containing element fluorine may generate hydrofluoric acid (HF) by contact of moisture with the Li salt. This non-aqueous electrolytic solution is degraded its pH level due to generation of the HF to be within a pH-level range of 4 to 5, for example. Accordingly, when an electrode plate of a used lithium-ion secondary battery is reused to newly produce the lithium-ion secondary battery 100 with the reused electrode plate, use of this non-aqueous electrolytic solution including the HF with low pH level results in formation of LiF coating with high resistance on the electrode active material surface by the reaction of the HF in the non-aqueous electrolytic solution and the lithium included in the coating of the electrode active material surfaces of the reused electrode plate, so that the IV resistance of the secondary battery could be increased.

Figure 8:
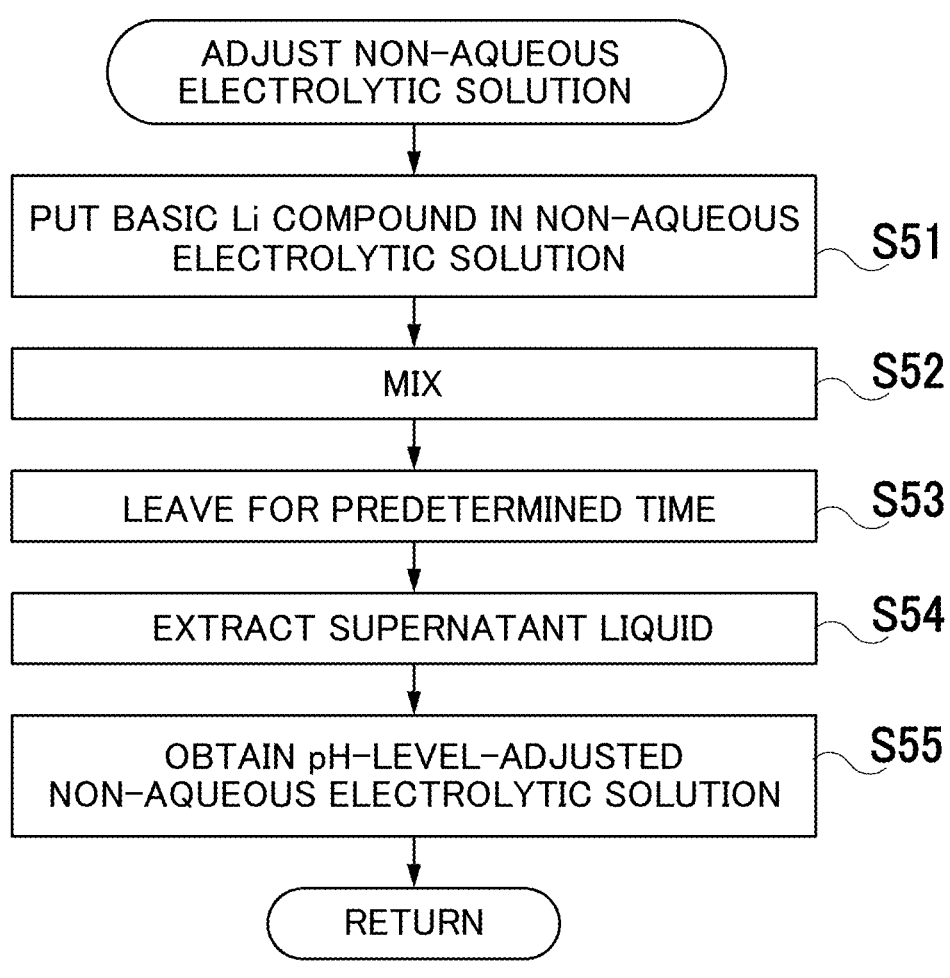
FIG. 8 is a flow chart illustrating a flow of an adjusting method of non-aqueous electrolytic solution in the embodiment.

To address this, in the present embodiment, step S5 (a non-aqueous electrolytic solution adjusting step) is performed to reduce an HF amount in the non-aqueous electrolytic solution. Specifically, in the step S5 (the non-aqueous electrolytic solution adjusting step), the non-aqueous electrolytic solution 10 including the Li salt containing element fluorine is made to be in contact with the basic Li compound 20 so that the pH-level-adjusted non-aqueous electrolytic solution 40 which has been adjusted its pH level to be within the range of 6 to 8 inclusive is produced. FIG. 8 is a flowchart showing the flow of the adjusting method of the non-aqueous electrolytic solution according to the embodiment.

Figure 9:
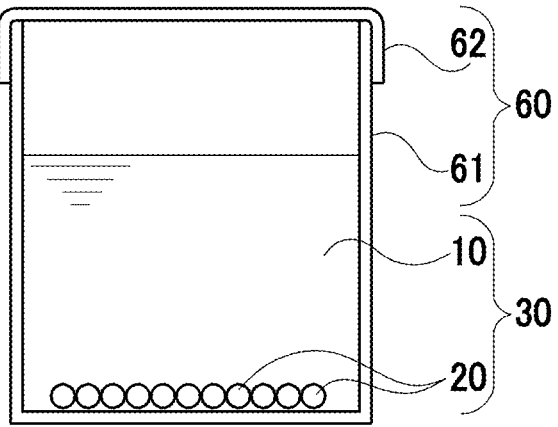
FIG. 9 is an explanatory view of the adjusting method of the non-aqueous electrolytic solution.

Firstly, in step S51, the basic Li compound 20 is put in the non-aqueous electrolytic solution 10 including the Li salt containing element fluorine. Specifically, a container body 61 and a lid 62 configuring a sealed container 60 are prepared. In the container body 61 which has been placed in a glove box with the Ar gas atmosphere, the non-aqueous electrolytic solution 10 of a predetermined amount (for example, 200 ml) is injected, and further, the basic Li compound 20 of a predetermined amount (for example, 4 g) is injected. Thus, a basic-lithium-compound-added non-aqueous electrolytic solution 30 in which the basic Li compound 20 is added to the non-aqueous electrolytic solution 10 including Li salt containing element fluorine is produced. Thereafter, the container body 61 is hermetically sealed by the lid 62 to complete the sealed container 60 (see FIG. 9).

Herein, the non-aqueous electrolytic solution 10 of the present embodiment includes $LiPF_6$ as the Li salt containing element fluorine and includes organic solvent in which EC (ethylene carbonate), EMC (ethyl methyl carbonate), and DMC (dimethyl carbonate) are mixed as a solvent. Further, as the basic Li compound 20, powder of $Li_3PO_4$ (lithium phosphate) is used.

Subsequently, in step S52, the non-aqueous electrolytic solution 10 and the basic Li compound 20 are mixed. To be specific, in the same glove box with the Ar gas atmosphere, the sealed container 60 in which the non-aqueous electrolytic solution 10 and the basic Li compound 20 are accommodated is shaken so that the non-aqueous electrolytic solution 10 and the basic Li compound 20 are agitated and mixed.

Subsequently, in step S53, the sealed container 60 accommodated inside with a mixed solution of the non-aqueous electrolytic solution 10 and the basic Li compound 20 is left (preserved) as it is for a predetermined time. Thus, the basic Li compound 20 ($Li_3PO_4$) and the HF included in the non-aqueous electrolytic solution 10 are reacted well enough and undissolved substance such as the basic Li compound 20 and the reaction product of the basic Li compound 20 and the HF are precipitated. In this manner, the HF included in the non-aqueous electrolytic solution 10 can be reduced or removed.

In the present embodiment, the term for leaving (the term for preservation) is set as 1 hour. Further, it is conceived that a chemical reaction of the basic Li compound 20 ($Li_3PO_4$) and the HF contained in the non-aqueous electrolytic solution 10 is indicated as follows.

$$Li_3PO_4 + 3HF \rightarrow 3LiF + H_3PO_4(H^+ + H_2PO_4^-) \qquad \text{Formula}$$

Figure 10:
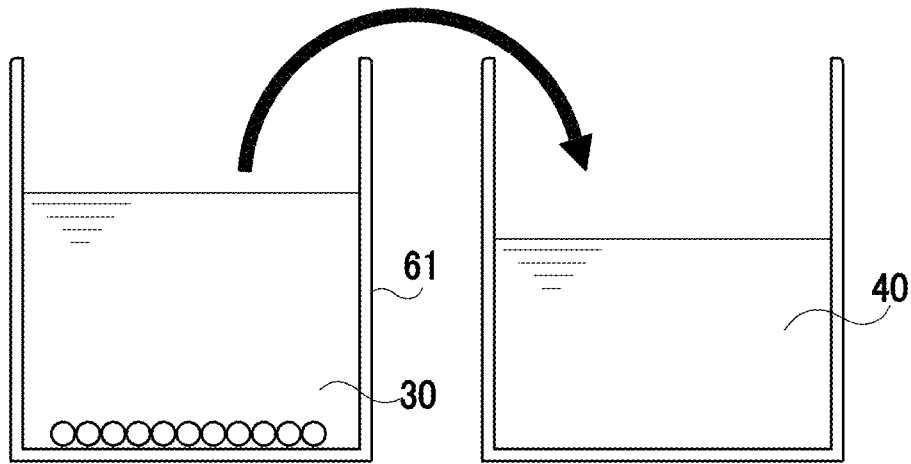
FIG. 10 is another explanatory view of the adjusting method of the non-aqueous electrolytic solution.

Subsequently, in step S54, in the subject glove box with the Ar gas atmosphere, the lid 62 of the sealed container 60 is taken off and supernatant liquid of the non-aqueous electrolytic solution 30 of which the basic Li compound 20 and others have been precipitated is extracted from the container body 61 (see FIG. 10). This supernatant liquid is the pH-level-adjusted non-aqueous electrolytic solution 40 in which a pH level has been adjusted within a range of 6 to 8 inclusive. Finally, in step S55, the pH-level-adjusted non-aqueous electrolytic solution 40 is obtained. This pH-level-adjusted non-aqueous electrolytic solution 40 has been decreased its content amount of the HF as compared to the non-aqueous electrolytic solution 10 prior to performing the step S5 (the non-aqueous electrolytic solution adjusting step).

Figure 11:
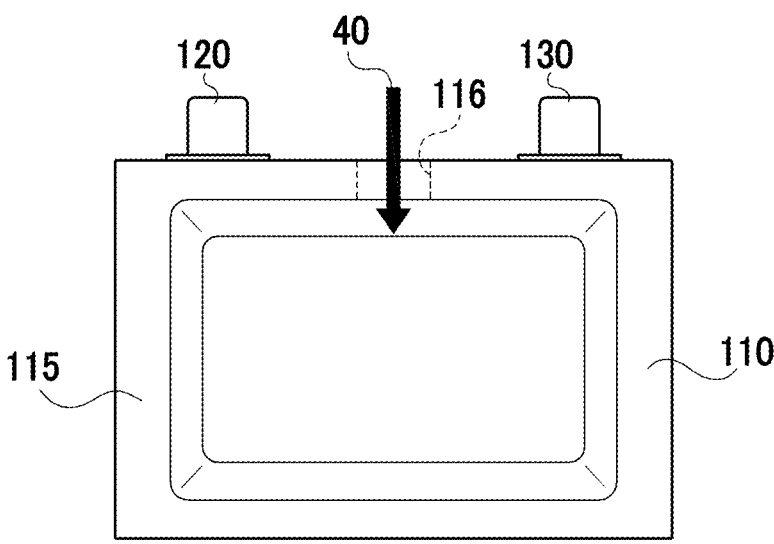
FIG. 11 is an explanatory view of the producing method of the lithium-ion secondary battery with the reused electrode plate in the embodiment.

Subsequently, in step S6 (an injecting step), the pH-level-adjusted non-aqueous electrolytic solution 40 is injected in the battery case 110 through an injection port 116 as shown in FIG. 11. Thereafter, the injection port 116 is closed by thermal welding so that the battery case 110 is sealed, and accordingly, the electrode-plate-reused lithium-ion secondary battery 100 shown in FIG. 1 is completed.

As explained above, in the present embodiment, the pH-level-adjusted non-aqueous electrolytic solution 40 is injected in the battery case 110 in step S6 (the injecting step). Namely, the pH-level-adjusted non-aqueous electrolytic solution 40 has been reduced or removed the amount of the HF by the contact of the basic Li compound 20, and the thus pH-level-adjusted non-aqueous electrolytic solution 40 is used as the electrolytic solution for the electrode-platereused lithium-ion secondary battery 100. Thereby, the reaction of the HF and the Li contained in the coating of the surfaces of the positive active material 163 and the negative active material 173 is reduced, and thus it is possible to reduce formation of the LiF coating with high resistance on the surfaces of the positive active material 163 and the negative active material 173 by the reaction. Therefore, in the present embodiment, it can be achieved to produce the electrode-plate-reused lithium-ion secondary battery 100 with less IV resistance.

<Comparison Test of IV Resistance>

Firstly, four different types of non-aqueous electrolytic solution are prepared to produce four types of electrode-plate-reused lithium-ion secondary batteries 100 (hereinafter, referred as sample batteries 1 to 4). In producing the sample battery 1, a process of the step S5 (the non-aqueous electrolytic solution adjusting step) is not performed and the non-aqueous electrolytic solution 10 is used as it is. Namely, the non-aqueous electrolytic solution 10 is injected in the battery case 110 in the step S6 (the injecting step). The pH level of the non-aqueous electrolytic solution 10 before injection in the battery case 110 in the step S6 is measured and the pH level is 4.5. This measurement result suggests that the pH level decreases to 4.5 since the moisture comes to contact with the Li salt (LiPF$_6$) containing element fluorine to generate the HF (hydrofluoric acid).

In producing the sample battery 2, the process of the step S5 (the non-aqueous electrolytic solution adjusting step) is performed. Specifically, in step S51, 0.2 g of the basic Li compound 20 (Li$_3$PO$_4$) is put in 200 ml of the non-aqueous electrolytic solution 10. After that, the pH level of the pH-level-adjusted non-aqueous electrolytic solution 40 which is obtained in the step S55 is measured, and the pH level is 5.0 which is increased as compared to the non-aqueous electrolytic solution 10 before performing the step S5 (the non-aqueous electrolytic solution adjusting step). This result suggests the basic Li compound 20 and the HF included in the non-aqueous electrolytic solution 10 make a reaction by the contact of the non-aqueous electrolytic solution 10 including Li salt containing element fluorine with the basic Li compound 20, so that the HF included in the non-aqueous electrolytic solution 10 is decreased to raise the pH level.

In producing the sample battery 3, too, the process of the step S5 (the non-aqueous electrolytic solution adjusting step) is performed. Specifically, in the step S51, 2.0 g of the basic Li compound 20 (Li$_3$PO$_4$) is put in 200 ml of the non-aqueous electrolytic solution 10. After that, the pH level of the pH-level-adjusted non-aqueous electrolytic solution 40 which is obtained in the step S55 is measured, and the pH level is 6.0 which is largely increased as compared to the non-aqueous electrolytic solution 10 before performing the step S5 (the non-aqueous electrolytic solution adjusting step). This pH-level-adjusted non-aqueous electrolytic solution 40 is considered to become the non-aqueous electrolytic solution which is decreased the HF enough as compared to the non-aqueous electrolytic solution 10.

In producing the sample battery 4, too, the process of the step S5 (the non-aqueous electrolytic solution adjusting step) is performed. Specifically, in the step S51, 20.0 g of the basic Li compound 20 (Li$_3$PO$_4$) is put in 200 ml of the non-aqueous electrolytic solution 10. After that, the pH level of the pH-level-adjusted non-aqueous electrolytic solution 40 which is obtained in the step S55 is measured, and the pH level is 8.0 which is largely increased as compared to the non-aqueous electrolytic solution 10 before performing the step S5 (the non-aqueous electrolytic solution adjusting step). This pH-level-adjusted non-aqueous electrolytic solution 40 is considered to become the non-aqueous electrolytic solution which is decreased the HF enough (or the HF has disappeared) as compared to the non-aqueous electrolytic solution 10.

Subsequently, the sample battery 1 is measured its IV resistance value. Specifically, the sample battery 1 is adjusted its SOC of 50%, and then left as it is for three hours under a temperature environment of 0° C. Thereafter, under the temperature environment of 0° C., the sample battery 1 is discharged at a constant current value of 0.2 C for ten seconds and a battery voltage value at the time of discharge termination is measured. Further, the discharge is performed for several times under the same condition with one exception of differentiating the discharge current value to 0.5 C, 1 C, and 2 C, and the battery voltage value at the time of termination of ten-second discharge in each of the discharge current values is measured.

Figure 12:
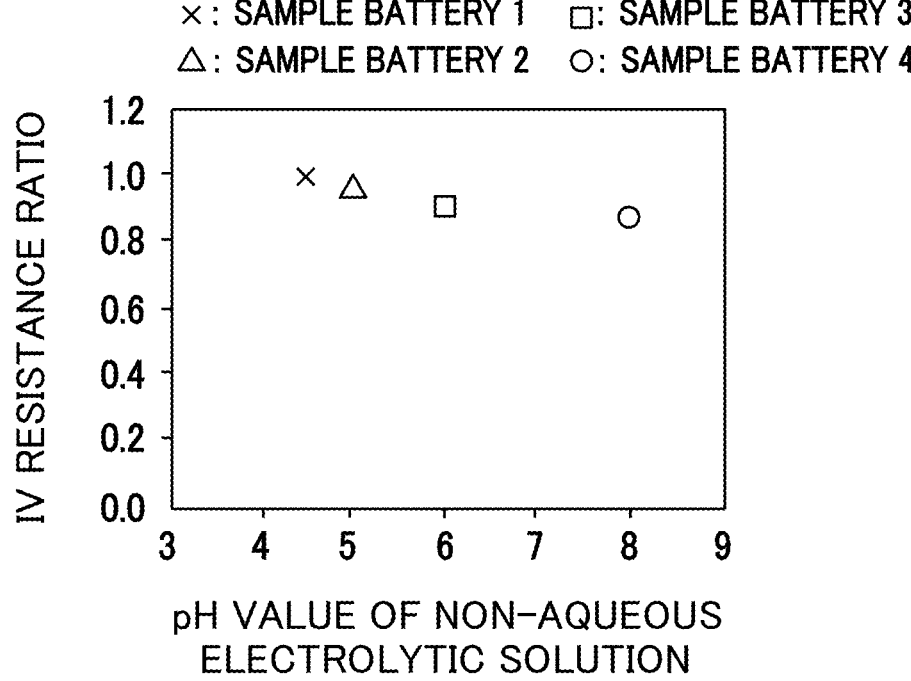
FIG. 12 is a diagram illustrating comparison of IV resistances of the lithium-ion secondary batteries with the reused electrode plates.

After that, on a plane of coordinates in which a discharge current value is put on a horizontal axis and a battery voltage value at the time of termination of discharge is put on a vertical axis, the data obtained by the above-mentioned discharge is plotted. Then, based on these plotted data, an approximation line (a linear formula) is calculated by a least-square method and its inclination is obtained as an IV resistance value of the sample battery 1. As similar to this method, the IV resistance values of the sample batteries 2 to 4 are also measured. Then, the IV resistance value of the sample battery 1 is set as a reference (=1) to obtain a ratio (referred as an IV resistance ratio) of the IV resistance values of other sample batteries 2 to 4 to the IV resistance value of the sample battery 1. The results of the ratio are shown in FIG. 12. In FIG. 12, the pH level of the non-aqueous electrolytic solution used for the respective sample batteries are put on the horizontal axis and the values of the IV resistance ratio are put on the vertical axis.

As shown in FIG. 12, the sample batteries 3 and 4, which use the non-aqueous electrolytic solution (the pH-level-adjusted non-aqueous electrolytic solution 40) having the pH level within a range of 6 to 8 inclusive, have the IV resistance value lower by about 10% than the sample battery 1 which uses the non-aqueous electrolytic solution 10 with the pH level of 4.5. This is because the non-aqueous electrolytic solution (the pH-level-adjusted non-aqueous electrolytic solution 40) including the Li salt containing element fluorine and having the pH level within the range of 6 to 8 inclusive is the non-aqueous electrolytic solution from which the HF has been reduced or removed as compared to the non-aqueous electrolytic solution 10 with the pH level of 4.5. Thus, the reaction of the HF and the Li included in the coating of the surfaces of the positive active material 163 and the negative active material 173 is reduced and thereby it is achieved to reduce formation of the LiF coating with high resistance on the surfaces of the positive active material 163 and the negative active material 173 by the subject reaction. Further, the sample battery 2, which uses the non-aqueous electrolytic solution with the pH level within a range of 5 or more and less than 6, the IV resistance value is reduced by about 5% as compared to the sample battery 1 which uses the non-aqueous electrolytic solution 10 with the pH level of 4.5. Even though the effect is less than that of the sample batteries 3 and 4, this sample battery 2 can also reduce the IV resistance value as compared to the sample battery 1.

As explained above, according to the adjusting method of the non-aqueous electrolytic solution in the present embodiment (the step S5), the HF included in the non-aqueous electrolytic solution can be reduced or removed. Further, according to the manufacturing method of the electrode-plate-reused lithium-ion secondary battery in the present embodiment, it is achieved to produce the electrode-plate-reused lithium-ion secondary battery 100 with less IV resistance.

The present disclosure has been explained above in line with the embodiment, but the present disclosure is not limited to the embodiment and may naturally be made any modifications without departing from the scope of the disclosure.

REFERENCE SIGNS LIST

10 Nonaqueous electrolytic solution
20 Basic Li compound
40 pH-level-adjusted non-aqueous electrolytic solution (non-aqueous electrolytic solution)
100 Electrode-plate-reused lithium-ion secondary battery
110 Battery case
150 Electrode body
160 Positive electrode plate (cleansed positive electrode plate)
260 Positive electrode plate
170 Negative electrode plate (cleansed negative electrode plate)
270 Negative electrode plate
200 Used lithium-ion secondary battery

What is claimed is:

1. A method of newly producing a lithium-ion secondary battery by using an electrode plate of a used lithium-ion secondary battery, the method comprising:

providing the electrode plate of the used lithium-ion secondary battery;

cleansing the electrode plate having been taken out of the used lithium-ion secondary battery by polar solvent;

drying the electrode plate thereafter to obtain a cleansed electrode plate;

forming an electrode body and attaching the cleansed electrode plate to the electrode body;

providing a battery case;

securing the electrode body inside the battery case;

injecting non-aqueous electrolytic solution in a space between the battery case and the cleansed electrode plate inside the battery case, wherein the non-aqueous electrolytic solution comprises lithium salt containing element fluorine and a pH level of which is in a range of 6 to 8 inclusive, wherein the method includes non-aqueous electrolytic solution adjusting of bringing the non-aqueous electrolytic solution including lithium salt containing element fluorine into contact with a basic lithium compound to adjust a pH level in a range of 6 to 8 inclusive to form a pH-level-adjusted non-aqueous electrolytic solution; and injecting the pH-level-adjusted non-aqueous electrolytic solution in the battery case.

* * * * *